(12) United States Patent
Chen

(10) Patent No.: US 10,359,673 B2
(45) Date of Patent: Jul. 23, 2019

(54) LCD PANEL AND LCD DEVICE

(71) Applicant: Shenzhen China Star Optoelectronics Technology Co., Ltd., Shenzhen, Guangdong (CN)

(72) Inventor: Shuai Chen, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 114 days.

(21) Appl. No.: 15/544,881

(22) PCT Filed: May 25, 2017

(86) PCT No.: PCT/CN2017/085937
§ 371 (c)(1),
(2) Date: Jul. 19, 2017

(87) PCT Pub. No.: WO2018/205314
PCT Pub. Date: Nov. 15, 2018

(65) Prior Publication Data
US 2018/0329261 A1    Nov. 15, 2018

(30) Foreign Application Priority Data
May 9, 2017    (CN) .......................... 2017 1 0322465

(51) Int. Cl.
*G02F 1/1335* (2006.01)
*G02F 1/1343* (2006.01)
*G02F 1/1337* (2006.01)

(52) U.S. Cl.
CPC .... *G02F 1/134309* (2013.01); *G02F 1/13439* (2013.01); *G02F 1/133512* (2013.01); *G02F 1/133514* (2013.01); *G02F 1/133707* (2013.01); *G02F 2001/134345* (2013.01);
(Continued)

(58) Field of Classification Search
CPC ..................... G02F 1/134309; G02F 1/133512
See application file for complete search history.

(56) References Cited

U.S. PATENT DOCUMENTS

2009/0141228 A1* 6/2009 Shih .................. G02F 1/134309
349/139

FOREIGN PATENT DOCUMENTS

| CN | 1832177 A | 9/2006 |
|---|---|---|
| CN | 101038716 A | 9/2007 |
| CN | 101598877 A | 12/2009 |

(Continued)

*Primary Examiner* — Thanh Nhan P Nguyen
(74) *Attorney, Agent, or Firm* — Andrew C. Cheng

(57) ABSTRACT

An LCD panel and LCD device are disclosed. The LCD panel includes a first substrate and a second substrate, located opposite to each other, and a liquid crystal (LC) layer sandwiched between the first and the second substrates. The LCD panel has an active area having a plurality of sub-pixel areas arranged in an array, and shielding areas between two adjacent sub-pixel areas. A side of the first substrate adjacent to the LC layer includes a first electrode layer, the first electrode layer corresponding to the sub-pixel areas and shielding areas; and a side of the second substrate adjacent to the LC layer includes mutually independent second and third electrode layers; the second electrode layer corresponding to the sub-pixel areas and the third electrode layer corresponding to the shielding areas. The third electrode layer includes vias.

16 Claims, 4 Drawing Sheets

(52) U.S. Cl.
CPC ............ *G02F 2001/134381* (2013.01); *G02F 2201/121* (2013.01); *G02F 2201/123* (2013.01)

(56) References Cited

FOREIGN PATENT DOCUMENTS

| | | |
|---|---|---|
| CN | 104730785 A | 6/2015 |
| JP | H04350820 A | 12/1992 |

\* cited by examiner

US 10,359,673 B2

LCD PANEL AND LCD DEVICE

CROSS REFERENCE TO RELATED APPLICATIONS

This application claims the priority of Chinese Patent Application No. 201710322465.2 filed on May 9, 2017, titled "LCD panel and LCD device". The contents of the aforementioned prior application are incorporated herein by reference.

BACKGROUND OF THE INVENTION

1. Field of the Invention

The present invention relates to the field of display, and in particular to the field of LCD panel and LCD device.

2. The Related Arts

The liquid crystal display (LCD) device must rely on the backlight module to provide backlight to make the LCD device display image because the LCD panel does not illuminate.

As shown in FIG. 1, an LCD device of the known technology comprises an LCD panel 101, an upper polarizer 1021 and a lower polarizer 1022 located respectively on the upper and lower surfaces of the LCD panel 101, and a backlight module 103 located at a side of the lower polarizer 1022 away from the LCD panel 101; wherein, the LCD panel 101 comprises an array substrate 1011, a color film (CF) substrate 1012, and a liquid crystal (LC) layer 1013 sandwiched between the array substrate 1011 and the CF substrate 1012.

The known LCD device often suffers light leakage when displaying dark state. For example, a part of the light emitted from the backlight source 103 of the LCD device is unable to enter the LCD panel 101 at a perpendicular angle, and this part of light, after polarized by the lower polarizer 1022, forms an incident angle with the optical axis of LC molecules in the LC layer 1013 to enter the LC layer 1013; wherein, for the LC molecules of the LCD panel 101, when the LCD device is in dark state displaying, the optical axis is perpendicular to the LCD panel 101. Because of the birefringence property of the LC molecules, this part of light incident to the LC layer 1013 with an angle will experience birefringence effect and become elliptically polarized light. When the light reaches the upper polarizer 1021, the light cannot be completely absorb, resulting in light leakage phenomenon when the LCD device displaying the dark state and further restricting the improvement of the contrast.

SUMMARY OF THE INVENTION

The primary object of the present invention is to provide an LCD panel, able to improve light leakage in dark state and enhance display performance.

Another object of the present invention is to provide an LCD device with the aforementioned LCD panel.

The present invention provides a liquid crystal display (LCD) panel, comprising: a first substrate and a second substrate, disposed opposite to each other, and a liquid crystal (LC) layer sandwiched between the first substrate and the second substrate; the LCD panel having an active area disposed with a plurality of sub-pixel areas arranged in an array, and shielding areas between two adjacent sub-pixel areas; a side of the first substrate adjacent to the LC layer being disposed with a first electrode layer, the first electrode layer being corresponding to the sub-pixel areas and shielding areas; a side of the second substrate adjacent to the LC layer being disposed with a second electrode layer and a third electrode layer, the second electrode layer and the third electrode layer being mutually independent; the second electrode layer being corresponding to the sub-pixel areas and the third electrode layer being corresponding to the shielding areas; wherein, the third electrode layer being disposed with vias.

According to an embodiment of the present invention, the second substrate is further disposed with a shielding protrusion element, the shielding protrusion element corresponds to the shielding areas and the third electrode layer covers the shielding protrusion element.

According to an embodiment of the present invention, the shielding protrusion element is T-shaped, and has a protrusion part protruding beyond the vias.

According to an embodiment of the present invention, the third electrode layer comprises a plurality of stripe electrodes arranged with space apart, and each stripe electrode is disposed with a plurality of vias.

According to an embodiment of the present invention, the shielding protrusion element extends along the length direction of the stripe electrodes.

According to an embodiment of the present invention, the first substrate is further disposed with a black matrix, the black matrix corresponds to the shielding areas, and the first electrode layer covers the black matrix.

According to an embodiment of the present invention, the first substrate is a color film substrate, and the first electrode layer is a common electrode layer; the second substrate is an array substrate, and the second electrode layer is a pixel electrode layer.

According to an embodiment of the present invention, the first substrate is an array substrate, and the first electrode layer is a pixel electrode layer; the second substrate is a color film substrate, and the second electrode layer is a common electrode layer.

According to an embodiment of the present invention, the first electrode layer and the second electrode layer are made of transparent conductive material.

The present invention also provides a liquid crystal display (LCD) device, comprising: a backlight source and an LCD panel; the backlight source and the LCD panel being stacked, the LCD panel comprising: a first substrate and a second substrate, disposed opposite to each other, and a liquid crystal (LC) layer sandwiched between the first substrate and the second substrate; the LCD panel having an active area disposed with a plurality of sub-pixel areas arranged in an array, and shielding areas between two adjacent sub-pixel areas; a side of the first substrate adjacent to the LC layer being disposed with a first electrode layer, the first electrode layer being corresponding to the sub-pixel areas and shielding areas; a side of the second substrate adjacent to the LC layer being disposed with a second electrode layer and a third electrode layer, the second electrode layer and the third electrode layer being mutually independent; the second electrode layer being corresponding to the sub-pixel areas and the third electrode layer being corresponding to the shielding areas; wherein, the third electrode layer being disposed with vias.

According to an embodiment of the present invention, the second substrate is further disposed with a shielding protrusion element, the shielding protrusion element corresponds to the shielding areas and the third electrode layer covers the shielding protrusion element.

According to an embodiment of the present invention, the shielding protrusion element is T-shaped, and has a protrusion part protruding beyond the vias.

According to an embodiment of the present invention, the third electrode layer comprises a plurality of stripe electrodes arranged with space apart, and each stripe electrode is disposed with a plurality of vias.

According to an embodiment of the present invention, the shielding protrusion element extends along the length direction of the stripe electrodes.

According to an embodiment of the present invention, the first substrate is further disposed with a black matrix, the black matrix corresponds to the shielding areas, and the first electrode layer covers the black matrix.

According to an embodiment of the present invention, the first substrate is a color film substrate, and the first electrode layer is a common electrode layer; the second substrate is an array substrate, and the second electrode layer is a pixel electrode layer.

According to an embodiment of the present invention, the first substrate is an array substrate, and the first electrode layer is a pixel electrode layer; the second substrate is a color film substrate, and the second electrode layer is a common electrode layer.

According to an embodiment of the present invention, the first electrode layer and the second electrode layer are made of transparent conductive material.

Compared to the known techniques, the present disposes a first electrode layer at the side of the first substrate adjacent to the LC layer, with the first electrode layer corresponding to the sub-pixel areas and the shielding areas, and mutually independent a second electrode layer and a third electrode layer at the side of the second substrate adjacent to the LC layer, with the second electrode layer corresponding to the sub-pixel areas and the third electrode layer corresponding to the shielding areas; wherein, the third electrode disposed with vias. When the LCD panel is in the dark state, the LC molecules between the first and third electrode layers are polarized under the effect of the voltage bias (driving voltage) to achieve the multi-domain division effect, and is filtered out by the orthogonal polarizers of the upper and the lower substrates, so as to improve the problem of light leakage in dark state for the LCD panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

FIG. 2 is a cross-sectional view showing the LCD panel of the present invention when not powered on.

DETAILED DESCRIPTION OF THE PREFERRED EMBODIMENTS

To further explain the technical means and effect of the present invention, the following refers to embodiments and drawings for detailed description. Apparently, the described embodiments are merely some embodiments of the present invention, instead of all embodiments. All other embodiments based on embodiments in the present invention and obtained by those skilled in the art without departing from the creative work of the present invention are within the scope of the present invention.

Figure 1:
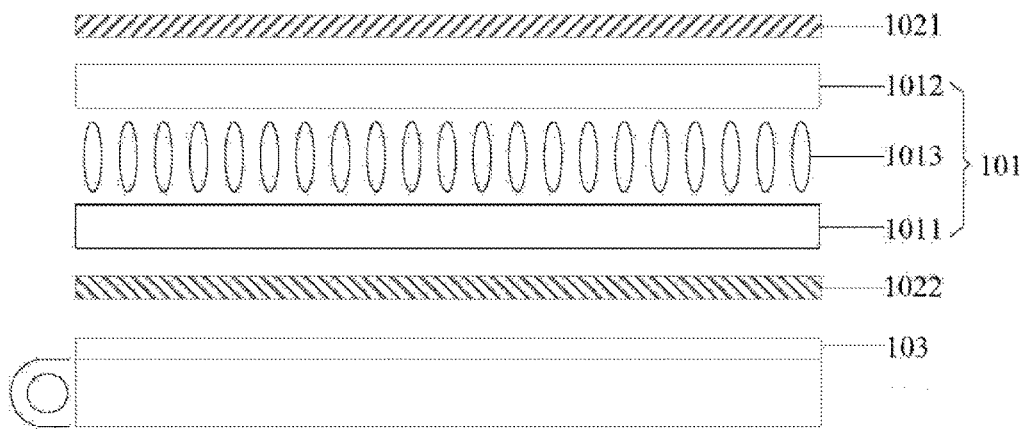
FIG. 1 is a cross-sectional view showing the structure of a known LCD panel.
Figure 2:
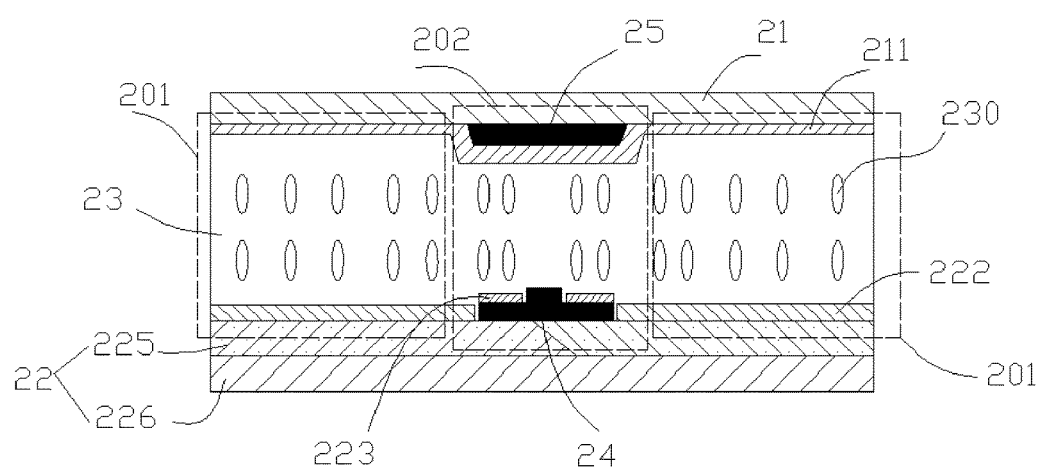

Refer to FIG. 2. FIG. 2 is a cross-sectional view showing the LCD panel of the present invention when not powered on. The LCD panel of the present invention comprises: a first substrate 21, a second substrate 22, and an LC layer 23. The LCD panel has an active area disposed with a plurality of sub-pixel areas 201 arranged in an array, and shielding areas 202 between two adjacent sub-pixel areas 201. The first substrate 21 and the second substrate 22 are disposed opposite to each other, and the LC layer 23 is sandwiched between the first substrate 21 and the second substrate 22. Preferably, the LC layer 23 comprises LC molecules 230 with negative dielectric anisotropy, and a plurality of reaction monomers mixed in the LC molecules 230. Wherein, the LC molecules 230 are a liquid crystal material with deflection orientation property in a specific direction by applying a driving voltage, and are able to achieve different deflection orientations by a threshold value of the driving voltage applied. When the LCD panel is not applied with a voltage, the LC molecules 230 of the LC layer 23 are vertically oriented. The reaction monomers are polymerizable monomers, such as, acrylic resin monomer molecules, methacrylate resin monomer molecules, vinyl resin monomer molecules, ethyleneoxy groups Resin monomer molecules, epoxy resin monomer molecules, and any combination of the above.

The side of the first substrate 21 adjacent to the LC layer 23 is disposed with a first electrode layer 211, and the first electrode layer 211 is corresponding to the sub-pixel areas 201 and shielding areas 202. The side of the second substrate 22 adjacent to the LC layer 23 is disposed with a second electrode layer 222 and a third electrode layer 223, and the second electrode layer 222 and the third electrode layer 223 are mutually independent. In other words, the voltages loaded to the second electrode layer 222 and the third electrode layer 223 can be controlled separately. The second electrode layer 222 is corresponding to the sub-pixel areas 201 and the third electrode layer 223 is corresponding to the shielding areas 202; wherein, the third electrode layer being disposed with vias (not numbered). IN other words, the LC layer 23 is between the first electrode layer 211 and the second/third electrode layers 222/223.

Figure 3:
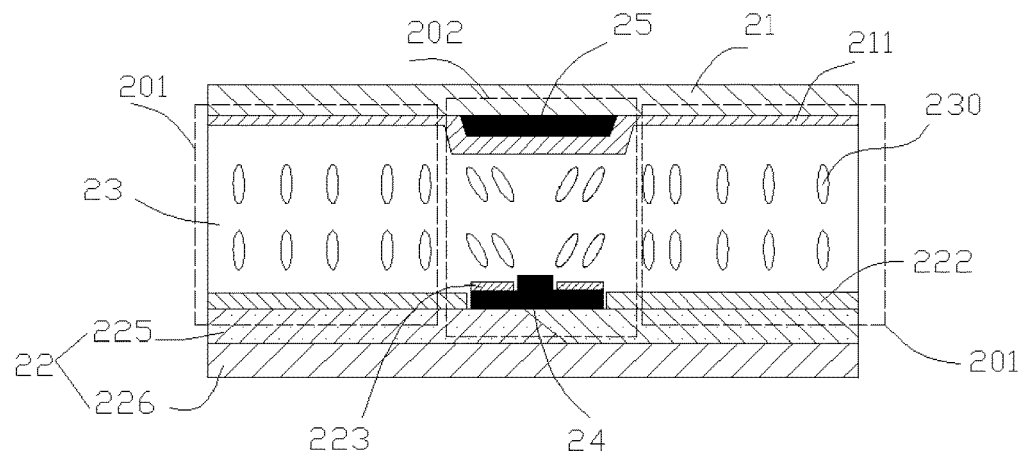
FIG. 3 is a cross-sectional view showing the LCD panel of FIG. 2 when in dark state.

Refer to FIG. 3. FIG. 3 is a cross-sectional view showing the LCD panel of FIG. 2 when in dark state. When the LCD panel is in the dark state (i.e., powered on), the first electrode layer 211 and the third electrode layer 223 are powered on, while the second electrode layer 222 is cut-off. At this point, because the LC molecules 230 between the first electrode layer 211 and the second electrode layer 222 are not driven by the driving voltage, i.e., the LC molecules 230 stay vertical orientation, the sub-pixel areas 201 is not light transmissive; both the first electrode layer 211 and the third electrode layer 223 are loaded with a voltage, and form a certain voltage bias; therefore, the LC molecules 230 between the first electrode layer 211 and the third electrode layer 223 are driven by voltage bias (driving voltage) to deflect orientation. In the mean time, because the third electrode layer 223 is disposed with vias, the LC molecules 230 near the vias will be under the effect of the boundary electrical field to incline towards the direction away from the vias; i.e., the LC molecules 230 in the LC layer 23 will have a plurality of inclination directions, resulting in a plurality of domains to achieve multi-domain segmentation effect. When the scattered light passing through the LC molecules 230, the light will pass length axis of the LC molecules 230 corresponding to sub-pixel areas 201 and the polarized state of the incident light does not change and will be filtered out by the orthogonal polarizers of the upper and lower substrates, thereby improving the light leakage problem in dark state for LCD panel.

In an embodiment of the present invention, the first substrate 21 is a color film substrate, and the first electrode layer 221 is a common electrode layer; correspondingly, the second substrate 22 is an array substrate, and the second electrode layer 222 is a pixel electrode layer. Specifically, the second substrate 22 may comprise a glass substrate 226 and a color resist layer 225 disposed on the glass substrate 226. The color resist layer 225 is between the glass substrate 226 and the second/third electrode layer 222/223. It should be noted that the color resist layer 225 comprises red color resist, green color resist, and blue color resist. The adjacent sub-pixels 201 have different color resists. Moreover, the first substrate 21 and the second substrate 22 are disposed respectively with polarizers (not shown). The polarizer of the first substrate 21 and the polarizer of the second substrate 22 are mutually perpendicular, i.e., the polarization directions are 90° apart.

Furthermore, in the present embodiment, the data lines provides electricity through the via holes on the second substrate 22 (array substrate) to the second electrode layer 222 (pixel electrode), and the third electrode layer is supplied with electricity along the peripheral of the second substrate 22.

According to an embodiment of the present invention, the second substrate 22 is further disposed with a shielding protrusion element 24, the shielding protrusion element 24 corresponds to the shielding areas 202. Specifically, the shielding protrusion element 24 is disposed at locations above the junction of adjacent color resists. The third electrode layer 223 covers the shielding protrusion element 24. In addition to shielding light, the shielding protrusion element 24 also provides the following effect: making the shielding areas 202 smaller than sub-pixel areas 201 so that the LC molecules 230 in the shielding areas 202 are easier to incline towards the sub-pixel areas 201 under the effect of driving voltage to achieve better effect on filtering scattered light.

Preferably, the shielding protrusion element 24 is T-shaped, and has a protrusion part protruding beyond the vias. It should be noted that the space corresponding to the above of the vias is smallest, and the space above the third electrode layer 223 as the second, while the space above the second electrode layer 222 (corresponding to the sub-pixel areas 201) is the largest. The purpose of such a disposition is to form a deflection trend towards the sub-pixel areas 201 for the LC molecules 230. The LC molecules 230 corresponding to the location of the vias deflects towards outside of the vias (the area corresponding to the third electrode) under the effect of boundary electrical field. The LC molecules 230 corresponding to the third electrode layer 223 will deflect towards the sub-pixel areas 201 to achieve better effect on filtering scattered light.

Figure 4:
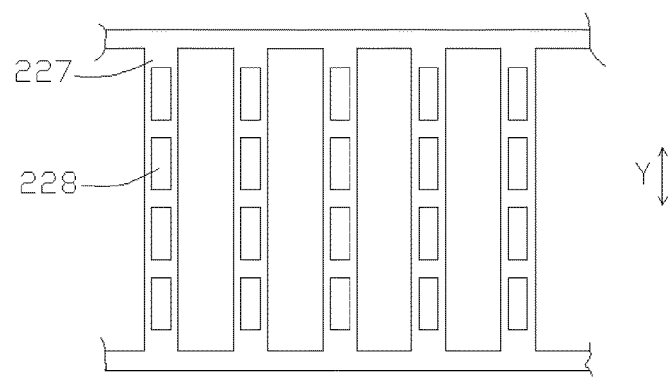
FIG. 4 is a schematic view showing the structure of the third electrode layer according to an embodiment of the present invention.

Specifically, refer to FIG. 4. FIG. 4 is a schematic view showing the structure of the third electrode layer according to an embodiment of the present invention. The third electrode layer 223 comprises a plurality of stripe electrodes 227 arranged with space apart, and each stripe electrode 227 is disposed with a plurality of vias 228. The plurality of stripe electrodes 227 is electrically connected to form an entirety. The stripe electrode 227 is formed by extending along the Y direction, wherein X direction is perpendicular to Y direction. Moreover, the shielding protrusion element 24 extends along the length direction of the stripe electrodes 227.

Figure 5:
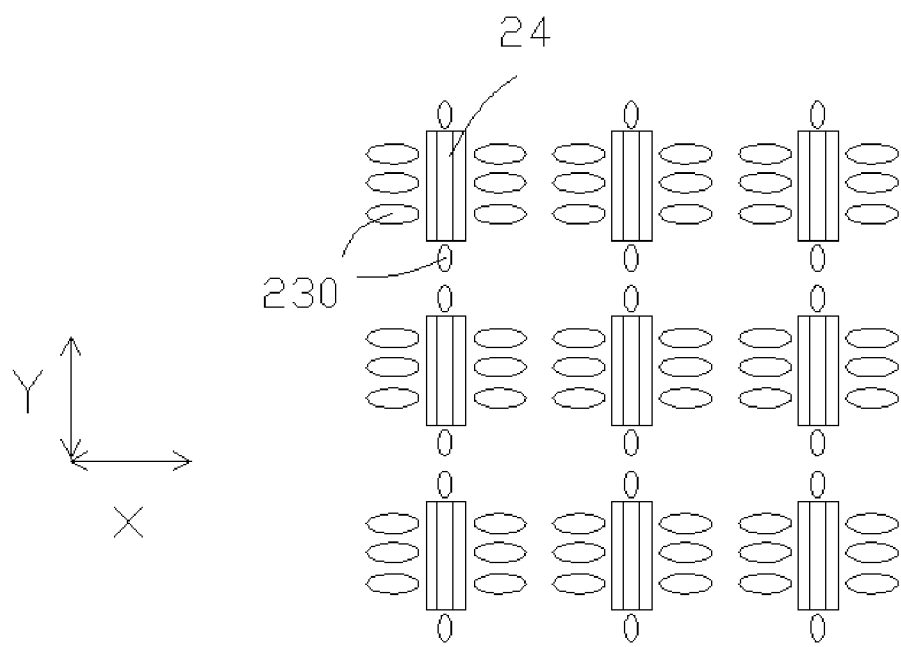
FIG. 5 is a top view showing the inclination of the LC molecules.

It should be noted that in the actual use of the LCD panel, when the light leakages in the X direction and Y direction are compared, the light leakage in the X direction deserves more attention. Refer to FIG. 5. FIG. 5 is a top view showing the inclination of the LC molecules. In the actual design process, it should be ensured that the LC molecules 230 are more inclined towards the X direction and less in the Y direction deflection. Thus, the length of the shielding protrusion element 24 can be designed as longer in the Y direction than in the X direction. That is, the shielding protrusion element 24 extends in the longitudinal direction of the strip electrode 227. It is to be understood that the length of the via holes 228 in the strip electrode 227 in the Y direction is larger than in the X direction.

Moreover, the first substrate 21 is further disposed with a black matrix 25, the black matrix 25 corresponds to the shielding areas 202, and the first electrode layer 21 covers the black matrix 25. The black matrix 25 is between the first substrate 21 and the first electrode layer 211. It should be understood that the black matrix 25 can further enhance the shielding effect of the LCD panel.

In another embodiment of the present invention, the first substrate 21 is an array substrate, and the first electrode layer 211 is a pixel electrode layer; correspondingly, the second substrate 22 is a color film substrate, and the second electrode layer 222 is a common electrode layer. In other words, the third electrode layer 223 is disposed on the color film substrate. It should be understood that the first electrode layer 211 and the second electrode layer 222 are made of transparent conductive material. Furthermore, the first electrode layer 211 and the second electrode layer 222 can be made of the same material or different materials, such as, indium tin oxide (ITO), indium zinc oxide (IZO), or any other combination of materials having both light transmission and conductivity.

Figure 6:
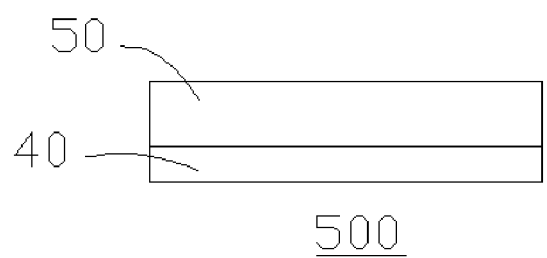
FIG. 6 is a schematic view showing the structure of an LCD device according to an embodiment of the present invention.

Refer to FIG. 6. FIG. 6 is a schematic view showing the structure of an LCD device according to an embodiment of the present invention. The present invention also provides a liquid crystal display (LCD) device 500, comprising: a backlight source 40 and an LCD panel 50; the backlight source 40 and the LCD panel 50 are disposed in a stack manner. Specifically, the backlight source 40 is disposed close to the LCD panel 50. The backlight source 40 provides light to the LCD panel 50, wherein, the LCD panel 50 can be the LCD panel of any aforementioned embodiments.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claim of the present invention.

What is claimed is:

1. A liquid crystal display (LCD) panel, comprising: a first substrate and a second substrate, disposed opposite to each other, and a liquid crystal (LC) layer sandwiched between the first substrate and the second substrate; the LCD panel having an active area disposed with a plurality of sub-pixel areas arranged in an array, and shielding areas between two adjacent sub-pixel areas; a side of the first substrate adjacent to the LC layer being disposed with a first electrode layer, the first electrode layer being corresponding to the sub-pixel areas and shielding areas; a side of the second substrate adjacent to the LC layer being disposed with a second electrode layer and a third electrode layer, the second electrode layer and the third electrode layer being mutually independent; the second electrode layer being corresponding to the sub-pixel areas and the third electrode layer being corresponding to the shielding areas; wherein, the third electrode layer being disposed with vias,
wherein the second substrate is further disposed with a shielding protrusion element, the shielding protrusion element corresponds to the shielding areas and the third electrode layer covers the shielding protrusion element.

2. The LCD panel as claimed in claim 1, wherein the shielding protrusion element is T-shaped, and has a protrusion part protruding beyond the vias.

3. The LCD panel as claimed in claim 1, wherein the third electrode layer comprises a plurality of stripe electrodes arranged with space apart, and each stripe electrode is disposed with a plurality of vias.

4. The LCD panel as claimed in claim 3, wherein the shielding protrusion element extends along the length direction of the stripe electrodes.

5. The LCD panel as claimed in claim 1, wherein the first substrate is further disposed with a black matrix, the black matrix corresponds to the shielding areas, and the first electrode layer covers the black matrix.

6. The LCD panel as claimed in claim 1, wherein the first substrate is a color film substrate, and the first electrode layer is a common electrode layer; the second substrate is an array substrate, and the second electrode layer is a pixel electrode layer.

7. The LCD panel as claimed in claim 1, wherein the first substrate is an array substrate, and the first electrode layer is a pixel electrode layer; the second substrate is a color film substrate, and the second electrode layer is a common electrode layer.

8. The LCD panel as claimed in claim 1, wherein the first electrode layer and the second electrode layer are made of transparent conductive material.

9. A liquid crystal display (LCD) device, comprising: a backlight source and an LCD panel; the backlight source and the LCD panel being stacked, the LCD panel comprising: a first substrate and a second substrate, disposed opposite to each other, and a liquid crystal (LC) layer sandwiched between the first substrate and the second substrate; the LCD panel having an active area disposed with a plurality of sub-pixel areas arranged in an array, and shielding areas between two adjacent sub-pixel areas; a side of the first substrate adjacent to the LC layer being disposed with a first electrode layer, the first electrode layer being corresponding to the sub-pixel areas and shielding areas; a side of the second substrate adjacent to the LC layer being disposed with a second electrode layer and a third electrode layer, the second electrode layer and the third electrode layer being mutually independent; the second electrode layer being corresponding to the sub-pixel areas and the third electrode layer being corresponding to the shielding areas; wherein, the third electrode layer being disposed with vias,
wherein the second substrate is further disposed with a shielding protrusion element, the shielding protrusion element corresponds to the shielding areas and the third electrode layer covers the shielding protrusion element.

10. The LCD device as claimed in claim 9, wherein the shielding protrusion element is T-shaped, and has a protrusion part protruding beyond the vias.

11. The LCD device as claimed in claim 9, wherein the third electrode layer comprises a plurality of stripe electrodes arranged with space apart, and each stripe electrode is disposed with a plurality of vias.

12. The LCD device as claimed in claim 11, wherein the shielding protrusion element extends along the length direction of the stripe electrodes.

13. The LCD device as claimed in claim 9, wherein the first substrate is further disposed with a black matrix, the black matrix corresponds to the shielding areas, and the first electrode layer covers the black matrix.

14. The LCD device as claimed in claim 9, wherein the first substrate is a color film substrate, and the first electrode layer is a common electrode layer; the second substrate is an array substrate, and the second electrode layer is a pixel electrode layer.

15. The LCD device as claimed in claim 9, wherein the first substrate is an array substrate, and the first electrode layer is a pixel electrode layer; the second substrate is a color film substrate, and the second electrode layer is a common electrode layer.

16. The LCD device as claimed in claim 9, wherein the first electrode layer and the second electrode layer are made of transparent conductive material.

* * * * *